US012756184B2

(12) United States Patent
Matheis et al.

(10) Patent No.: US 12,756,184 B2
(45) Date of Patent: Oct. 6, 2026

(54) RESTART PROTECTION DEVICE

(71) Applicant: Metabowerke GmbH, Nuertingen (DE)

(72) Inventors: Frank Matheis, Reichenbach (DE); Tobias Beck, Neuffen (DE)

(73) Assignee: Metabowerke GmbH, Nuertingen (DE)

( * ) Notice: Subject to any disclaimer, the term of this patent is extended or adjusted under 35 U.S.C. 154(b) by 1222 days.

(21) Appl. No.: 17/290,435

(22) PCT Filed: Nov. 4, 2019

(86) PCT No.: PCT/EP2019/080056
§ 371 (c)(1),
(2) Date: Apr. 30, 2021

(87) PCT Pub. No.: WO2020/094548
PCT Pub. Date: May 14, 2020

(65) Prior Publication Data

US 2021/0384724 A1 Dec. 9, 2021

(30) Foreign Application Priority Data

Nov. 5, 2018 (DE) ..................... 10 2018 127 502.1

(51) Int. Cl.
*H02H 11/00* (2006.01)
*B25F 5/00* (2006.01)

(52) U.S. Cl.
CPC ............. *H02H 11/007* (2013.01); *B25F 5/00* (2013.01); *H01M 2220/30* (2013.01); *H02H 11/006* (2013.01); *Y02E 60/10* (2013.01)

(58) Field of Classification Search
CPC .... Y02E 60/10; H02H 11/006; H02H 11/007; H01M 2220/30
See application file for complete search history.

(56) References Cited

U.S. PATENT DOCUMENTS

2007/0108941 A1 5/2007 Sainomoto et al.
2010/0079109 A1* 4/2010 Eilertsen ................ H02J 7/345 320/127

(Continued)

FOREIGN PATENT DOCUMENTS

CN 1967966 A 5/2007
CN 201048140 Y 4/2008

(Continued)

OTHER PUBLICATIONS

German Patent Office, "Office Action Regarding German Patent Application No. 102018127502.1", Oct. 17, 2019, p. 7, Published in: DE.

(Continued)

*Primary Examiner* — Julian D Huffman
*Assistant Examiner* — Johali A Torres Ruiz
(74) *Attorney, Agent, or Firm* — NOD Law PC

(57) ABSTRACT

The invention relates to a restart protection device (1) for a battery-powered electric hand tool (2), comprising—a control capacitor ($C_{CTRL}$) having a cathode and an anode, wherein the cathode can be connected to an earth connection (10) of the electric hand tool (2) and the anode can be connected via a battery pack interface (4) of the electric hand tool (2) to a connector wire (6) of a battery pack (3) of the electric hand tool (2); —a controllable discharge circuit (14) designed for discharging the control capacitor ($C_{CTRL}$), wherein a control input of the discharge circuit (14) can be connected via the battery pack interface (4) to a signal line (9) of the battery pack (3); —a measuring device (15) designed to determine a charge state of the control capacitor ($C_{CTRL}$); and—a control device (13) connected to the measuring device (15), which control device is configured to inhibit start-up of the electric hand tool (2) if the charge state of the control capacitor ($C_{CTRL}$) determined by means of the (Continued)

measuring device (15) is below a specified threshold value and an operating switch (12) on the electric hand tool (2) is pressed at the same time.

20 Claims, 1 Drawing Sheet

(56) References Cited

U.S. PATENT DOCUMENTS

| | | | | |
|---|---|---|---|---|
| 2012/0274245 | A1* | 11/2012 | Takano | B25F 5/00 318/139 |
| 2012/0306291 | A1 | 12/2012 | Wirnitzer | |
| 2013/0100718 | A1* | 4/2013 | Liu | H02M 1/36 363/49 |
| 2013/0334277 | A1* | 12/2013 | Shima | B25C 1/06 318/114 |
| 2015/0222205 | A1 | 8/2015 | Suda | |
| 2017/0155261 | A1* | 6/2017 | Chen | H02J 7/60 |
| 2018/0034388 | A1* | 2/2018 | Kawai | H03K 5/1536 |
| 2018/0131205 | A1* | 5/2018 | Jin | A47L 9/00 |
| 2018/0175617 | A1 | 6/2018 | Moessnang et al. | |
| 2019/0052148 | A1* | 2/2019 | Rahnamaee | H02K 7/145 |
| 2019/0207403 | A1* | 7/2019 | Yang | B25F 5/00 |

FOREIGN PATENT DOCUMENTS

| | | | |
|---|---|---|---|
| DE | 3611884 | A1 | 10/1987 |
| DE | 3621141 | A1 | 1/1988 |
| DE | 102015111921 | A1 | 1/2017 |
| DE | 102016120015 | A1 | 4/2018 |
| EP | 3106266 | A1 | 12/2016 |

OTHER PUBLICATIONS

Ross, Kenneth, "International Search Report and Written Opinion Regarding International Application No. PCT/EP2019/080056", Feb. 14, 2020, p. 12, Published in: EP.

China National Intellectual Property Administration, "First Office Action for Chinese Patent Application No. 201980072735.6 and Search Report," Jun. 6, 2024, 11 pages, Chinese Patent Office, CN.

* cited by examiner

RESTART PROTECTION DEVICE

CROSS-REFERENCE TO RELATED APPLICATION

This application is a national phase of PCT Patent Application No. PCT/EP2019/080056 filed on Nov. 5, 2019, which claims priority to German Patent Application No. 10 2018 127 502.1 filed Nov. 5, 2018 and entitled "RESTART PROTECTION DEVICES", the entire contents of which are incorporated herein by reference.

TECHNICAL FIELD

The disclosure relates to a restart protection device for a battery-operated electric power tool, comprising a control capacitor, a discharge circuit, a measuring means and a control means.

The disclosure also relates to a battery-operated electric power tool having a restart protection device.

The disclosure additionally relates to a restart protection method for a battery-operated electric power tool, according to which a control capacitor is charged if a battery pack is inserted into the electric power tool.

The disclosure further relates to a computer program product.

BACKGROUND

In the case of electric power tools, there is a particular danger that the electric power tool may be started unintentionally. This may be the case, in particular, if the manually actuated operating switch of the electric power tool for switching the electric power tool on and off can be locked in the switch-on position. In such cases, the operating switch may be in its switch-on position when the user connects the electric power tool to a power source, in particular when inserting one or more battery packs into a battery-operated electric power tool. Alternatively, unintentional start-up of a battery-operated electric power tool may also occur if the supply voltage, or battery voltage, fails temporarily during operation of the electric power tool due to a fault, e.g. due to an overheated battery pack, and is then unexpectedly made available again, e.g. when the battery pack has cooled down sufficiently.

Unintentional, and therefore possibly also unsupervised, start-up of the electric power tool can be highly dangerous for the user, as well as for other persons in the vicinity, and can also cause costly damage to the machine and the working environment. In order to avoid the dangers to users and their surroundings, it is necessary that the electric power tool is not automatically set to the switched-on operating state, or does not start immediately, upon provision of a supply voltage.

Accordingly, it is known from the prior art to provide a so-called restart protection for electric power tools, in particular also for battery-operated electric power tools. In the case of this solution, a safety system prevents the application of electrical power to the motor if the operating switch of the electric power tool is actuated in its switch-on position upon the electric power tool being connected to the voltage source. Unintentional start-up of the electric power tool can thereby be prevented. Usually, a safety circuit is provided for this purpose, which is connected to the operating switch of the electric power tool and determines its switching position. The safety circuit also usually has a monitoring circuit to determine whether the supply to the electric power tool has been restored after a supply voltage failure.

In practice, buffer capacitors are used in electric power tools, in particular also in battery-operated electric power tools, in order to minimize overvoltages, for example in the case of clocking of an electric power tool having a brushless DC motor, in such a manner that all power switches of the electric power tool can be operated within their specified range. For this purpose, high-capacitance buffer capacitors that have only very low equivalent series resistances (so-called "low-ESR" capacitors) are usually used at the battery pack connections. This is problematic in combination with a restart protection device, however, as the buffer capacitors themselves can temporarily act like an energy source due to their high capacitance and low series resistance and, in particular, removal of the battery pack cannot be detected by the restart protection device due to the buffering of the supply voltage. Thus, it can happen that the motor of the electric power tool initially stops following the removal of one or more battery packs, but the restart protection device continues to receive sufficient supply voltage from the buffer capacitor, with the result that it is not able to detect the removal, and thus also the standstill of the electric motor. As a result, when the battery pack is reinserted or the actual supply voltage is restored, the restart protection cannot be provided when the operating switch is actuated.

Solutions known from the prior art are described in the publications EP 3 106 266 A1, US 2012/0 306 291 A1 and DE 36 21 141 A1.

SUMMARY

In view of the known prior art, the present disclosure is based on the object of providing an improved restart protection device and an improved restart protection method in order to ensure particularly reliable restart protection, in particular also in the case of the presence of a buffer capacitor.

The present disclosure is also based on the object of providing an improved battery-operated electric power tool, having a restart protection device that, in particular, is suitable for reliably providing restart protection even in the case of use of a buffer capacitor.

The present disclosure is further based on the object of providing a computer program product having program code means in order to execute an advantageous restart protection method.

The object is achieved for the restart protection device by claim 1, and for the restart protection method by claim 13. With respect to the battery-operated electric power tool, the object is achieved by claim 11, and with respect to the computer program product by the features of claim 15.

The dependent claims advantageously relate to embodiments and variants of the disclosure.

Provided according to the disclosure is a restart protection device for a battery-operated electric power tool, which has a control capacitor having a cathode and an anode, wherein the cathode can be connected to a ground connection of the electric power tool, and the anode can be connected, via a battery-pack interface of the electric power tool, to a connection line of a battery pack of the electric power tool.

A ground connection of the electric power tool means an electrical ground connection that can be electrically connected, via the battery-pack interface, to a negative pole of at least one battery pack supplying the electric power tool.

In the context of the disclosure, a battery pack means both an accumulator having a single accumulator cell (also called a secondary cell) and an interconnected package having a plurality of accumulator cells. In the context of the disclosure, batteries or battery packs, i.e. non-rechargeable storage devices for electrical energy, are also included in the term "battery pack".

The restart protection device according to the disclosure comprises a controllable discharge circuit designed for discharging the control capacitor, wherein a control input of the discharge circuit can be connected to a signal line of the battery pack via the battery-pack interface.

The discharge circuit in this case may be designed to initiate, or effect, discharging of the capacitor upon a signal voltage, for example at the level of the supply voltage of the electric power tool, being applied to the control input, and/or upon transmission of a control current to the control input.

The restart protection device according to the disclosure further comprises a measuring means designed to detect a charge state of the control capacitor, and a control means that is connected to the measuring means and that is configured to block a starting of the electric power tool if the charge state of the control capacitor detected by means of the measuring means is below a defined threshold value and at the same time an operating switch of the electric power tool is actuated.

It is a particular advantage of the disclosure that the discharge circuit triggers or does not trigger the discharge function of the control capacitor in dependence on the state of a signal line of the battery pack. In this way, the problem of a buffer capacitor, between the ground connection and a supply connection of the electric power tool, obscuring a removal of the battery pack can be circumvented. On the other hand, a removal of the battery pack or a failure of the battery pack can advantageously be detected on the basis of the signal line of the battery pack, where usually no buffering, or at least no significant buffering, by means of capacitors takes place. As mentioned at the outset, the voltage of the machine electronics usually does not immediately drop to 0 volts when the battery pack fails or is removed, since the supply connection of the electric power tool is buffered by means of the buffer capacitor. By monitoring the signal line instead of a supply line, the influence of the buffer capacitor can thus be blocked out.

According to the disclosure, the restart protection device can be used in a particularly flexible manner for almost all conceivable variants of electric power tools, in particular battery-operated electric power tools. In particular, the restart protection device according to the disclosure can thus also be designed to be more reliable than the known restart protection devices of the prior art.

In a further development of the disclosure, it may be provided that the anode of the control capacitor can be connected to the connection line of the battery pack via a charging resistor.

Use of a charging resistor, which may be arranged between the battery-pack interface and the anode of the control capacitor, for example, enables the charging function of the control capacitor to be slowed down in a defined manner when the battery pack is inserted. It can thereby be ensured, for example, that the electronics of the electric power tool, in particular the control means, have sufficient time to start ("boot") and that the control capacitor is not charged faster than the control means can determine the restart protection event by means of the measuring means.

In principle, the charging resistor may also be composed of a resistor network, and thus of a plurality of individual electrical resistors. This also applies to all other further electrical resistors mentioned. The electrical interconnection of a number of resistors and the determination of a resulting total resistance are familiar to persons skilled in the art.

In a further development of the disclosure, it may further be provided that the connection line is a supply line of the battery pack or is the signal line of the battery pack.

Preferably, the connection line is a supply line, in particular a supply line of the battery pack carrying the supply voltage of the battery pack. In principle, however, it is may also be provided that the connection line is the same signal line that is connected to the control input of the discharge circuit—or another signal line. In the case of the battery pack being inserted, the charging of the control capacitor would then be effected via the signal line.

In a further development it may be provided, in particular, that the signal line of the battery pack is a temperature control line of the battery pack.

In most cases, a battery pack comprises an integrated battery management system (BMS) and at least one data interface, or a signal line. The BMS is used to monitor and/or control the battery pack by closed-loop control (sometimes also referred to as a "power management system" (PMS)), and usually transmits data in analogue and/or digital form regarding the state (e.g. charge state and/or temperature status) and/or design, or characteristic parameters (for example, nominal voltage, end-of-charge voltage and/or identification data) of the respective battery pack.

Battery packs, in particular of electric power tools, therefore usually have one or more signal and/or control lines in addition to the supply lines, for example to transmit data regarding the state of the battery pack to the electric power tool or a charger. Temperature monitoring of the battery pack is usually provided in order to avoid overheating of the battery pack. For this purpose, a temperature control line of the battery pack may be connected to the electric power tool via the battery-pack interface, and exchange data, in analogue and/or digital form, regarding the temperature status with the electric power tool, or transmit such data to the latter. The mere existence of the connection to the temperature control line, irrespective of the data actually transmitted, may be advantageously detected in order for the discharge circuit to recognize the presence of a battery pack or a failure of the battery pack.

For example, it may be provided that the temperature control line of the battery pack transmits data only in the event of a fault, i.e. in the case of an excessively high or excessively low temperature, although a no-load state ("idle state") can still be detected on the temperature control line when communication is inactive, as the temperature control line then usually carries the ground potential, the supply voltage or another defined electrical potential.

In a further development of the disclosure, it may be provided that, for the purpose of discharging the control capacitor, the discharge circuit has a controlled switch, in particular a semiconductor switch, connected in parallel with the control capacitor.

It may be provided that the controlled switch of the discharge circuit is realized as a bipolar transistor or MOSFET (metal-oxide-semiconductor field-effect transistor). In principle, any suitable semiconductor components may be used. The controlled switch may also be realized as an electromechanical relay. The design of the controlled switch is in principle not restrictive for the present disclosure. In particular, however, the use of a MOSFET as a controlled switch may be advantageous.

For example, an n-channel MOSFET may be provided, the gate terminal of which forms the control input of the discharge circuit and is connected to the signal line of the battery pack. This design is particularly advantageous if the signal line of the battery pack carries the ground potential when communication is inactive, in particular in the case of no-load operation, as a result of which the n-channel MOSFET is switched to high impedance on the output side. Following the removal of the battery pack and thus of the ground connection from the gate terminal, the n-channel MOSFET can form a low-impedance connection between the anode and the cathode of the control capacitor on the output side, enabling the control capacitor to be discharged in a controlled manner.

Alternatively, a p-channel MOSFET, for example, may also be provided, in particular if the signal line of the battery pack carries a voltage different from the ground potential, in particular the supply voltage of the battery pack, when communication is inactive, in particular in the case of no-load operation. In this case, the p-channel MOSFET would have a high-impedance connection on the output side, i.e. it would not be conductive, when the battery pack is present, or when there is a connection to the signal line of the battery pack, and can establish the low-impedance connection between the anode and the cathode of the control capacitor required for discharging the control capacitor when the battery pack, or the voltage, is removed from the gate terminal of the p-channel MOSFET.

In a further development of the disclosure, it may be provided that the control input of the discharge circuit can be connected via a pull-up resistor to a supply connection of the electric power tool, or via a pull-down resistor to the ground connection of the electric power tool.

Especially if a MOSFET is used as a controlled switch of the discharge circuit, the use of a pull-up resistor or pull-down resistor can be advantageous in order, in the absence of the connection to the signal line of the battery pack, to prevent an undefined output state of the transistor (due to the "floating gate"), and to provide a defined potential at the control input throughout.

In a further development, it may be provided that the pull-up resistor or the pull-down resistor is designed to be of a higher value than an electrical series resistance between the control input of the discharge circuit and the signal line of the battery pack.

Usually, very high-value resistances are used to realize the pull-up resistor or pull-down resistor, for example resistances greater than one megaohm, preferably greater than two megaohms, particularly preferably greater than four megaohms and most preferably greater than eight megaohms.

Use of a high-value pull-up resistor or pull-down resistor enables practically relevant leakage currents to be avoided when a battery pack is inserted.

In a further development of the disclosure, it may be provided that the threshold value is greater than 25% of the supply voltage of the battery pack, preferably greater than 50% of the supply voltage of the battery pack, particularly preferably greater than 75% of the supply voltage of the battery pack, for example even greater than 90% of the supply voltage of the battery pack.

Persons skilled in the art will be able to set the threshold value depending on the application. As a rule, the restart protection event should be detected as soon as possible after the supply voltage of the electric power tool has been established. For this reason, it may be advantageous not to wait until the control capacitor is fully charged, but to set the threshold value correspondingly lower.

In a further development of the disclosure, it may be provided that the measuring means has a controlled switch, in particular a semiconductor switch, via which the measuring means can be connected as required to the anode of the control capacitor for the purpose of detecting the charge state.

The controlled switch of the measuring means may likewise be, in particular, a bipolar transistor or a MOSFET.

It may be advantageous not to connect the measuring means permanently to the anode of the control capacitor, but only when a measurement of the charge state is intended. Decoupling the measuring means from the control capacitor, and thus also from the other electronics of the electric power tool connected to the anode of the control capacitor, may be advantageous, for example, in order to avoid leakage currents or other parasitic effects.

In a further development, it may be provided that the control means is configured to connect the measuring means to the anode of the control capacitor, by means of a control signal transmitted to a control input of the controlled switch of the measuring means, for the purpose of detecting the charge state of the control capacitor.

Thus, the control means may advantageously connect the measuring means to the anode of the control capacitor only when the control means requires detection of the charge state of the control capacitor for the purpose of recognizing the restart protection event.

However, it is also possible to permanently connect the measuring means to the control capacitor. A controlled switch may also be provided, the control input of which is permanently energized for this purpose, in order permanently to maintain the connection to the control capacitor.

The disclosure also relates to a battery-operated electric power tool, having a restart protection device according to the above, at least one battery pack and at least one battery-pack interface for receiving the at least one battery pack.

The electrical and mechanical interconnection of a plurality of battery packs to increase the power and/or operating time of the associated electric power tool is known in the prior art.

It may be provided in a further development that a buffer capacitor, in particular an electrolytic capacitor, is provided to compensate for overvoltages between a ground connection of the electric power tool and a supply connection of the electric power tool.

The disclosure is particularly suitable for use with a battery-operated electric power tool having a brushless DC motor.

Especially in the case of use a brushless DC motor, an electrolytic capacitor is usually provided as a buffer capacitor in order to keep overvoltages sufficiently low, during the relatively fast clocking of the motor, to enable the power switches to be operated within their specified range. Owing to the buffering of the capacitor, the conventional, known restart protection detection systems are unable, by monitoring of the battery voltage, to recognize, or reliably recognize, a restart protection event. The present disclosure solves the problem of the supply-voltage buffering by the electrolytic capacitor by monitoring a signal line of the battery pack, in particular at a temperature pin of the battery pack. This allows the control capacitor to be discharged despite the supply voltage buffered by the buffer capacitor.

The disclosure further relates to a restart protection method for a battery-operated electric power tool, according to which a control capacitor is charged if a battery pack is inserted into the electric power tool, and wherein a control means detects the charge state of the control capacitor by means of a measuring means and blocks a starting of the electric power tool if the charge state of the control capacitor is below a defined threshold value and at the same time an operating switch of the electric power tool is actuated. A removal of the battery pack from the electric power tool is detected by means of monitoring of a signal line of the battery pack by a discharge circuit, wherein the discharge circuit discharges the control capacitor again following a detected removal of the battery pack from the electric power tool.

In the context of the disclosure, a removal of the battery pack may also be understood as a functional removal of the battery pack, or of the supply voltage, for example when the battery pack switches off due to a fault, or is switched off by the battery management system, for example for exhaustive discharge protection, in the case of an excessively high temperature or in the case of excessive current flow.

The method may be designed so as to be software-independent.

In a further development of the disclosure, it may be provided that the charging of the control capacitor is delayed by use of a charging resistor connected ahead in series, in such a manner that the control means and/or further electrical components of the electric power tool are given sufficient time for a boot process.

Preferably, the control capacitor can be charged via the battery voltage terminals of the battery pack.

Thus, before starting of the electronics, or of the electric power tool, the charge state of the control capacitor can be queried. If this has not yet reached its final value or a defined threshold value following the booting of the processor, in particular of the control means, a restart protection event is recognized, and the motor of the electric power tool is prevented from starting if the operating switch of the electric power tool is switched on, for example locked.

The discharge circuit is provided for rapid discharging of the control capacitor following the removal of the battery pack or after the supply voltage of the battery pack has dropped, which discharge circuit preferably connects in parallel to the control capacitor a transistor that is switched on briefly, in particular by the supply voltage buffered in the buffer capacitor, until the control capacitor is empty.

Preferably, the control input of the discharge circuit, in particular a gate terminal of a MOSFET, is directly connected to a temperature pin of the battery pack. If the connection to the temperature pin is disconnected, it may be provided that the MOSFET is switched to low resistance, or conductive, on the output side and discharges the control capacitor, if necessary despite a connected buffer capacitor. If the battery pack is then reconnected with the switch locked or the supply voltage is restored in another way (restart protection event), the MOSFET becomes highly resistive, or non-conductive, on the output side, since the connection to the temperature pin is restored, as a result of which the control capacitor may charge via a defined charging resistor, for instance to battery voltage or supply voltage. This charging can be detected and the motor of the electric power tool blocked from starting. In normal operation, the charge state of the control capacitor is usually constant.

The disclosure also relates to a computer program product having program code means for performing a restart protection method, described above, when the program is executed on a control means of an electric power tool.

The control means may be realized as a microprocessor. Instead of a microprocessor, any other means may be provided for implementing the control means, for example one or more arrangements of discrete electrical components on a printed circuit board, a programmable logic controller (PLC), an application-specific integrated circuit (ASIC), or any other programmable circuit, for example also a field-programmable gate array (FPGA), a programmable logic array (PLA) and/or a commercially available computer.

The control means may in principle also be such that it can be used for open-loop and/or closed-loop control within the scope of further methods within the electric power tool.

Features that have already been described in connection with the restart protection device according to the disclosure can of course also be advantageously implemented for the restart protection method, the battery-operated electric power tool and the computer program product—and vice versa. Furthermore, advantages already mentioned in connection with the restart protection device according to the disclosure can also be understood in relation to the restart protection method, the battery-operated electric power tool and the computer program product—and vice versa.

In addition, it is to be noted that terms such as "comprising", "having" or "with" do not exclude other features or steps. Furthermore, terms such as "a" or "the" that refer to a singular number of steps or features do not exclude a plurality of features or steps—and vice versa.

Exemplary embodiments of the disclosure are described in greater detail in the following on the basis of the drawing.

The figures each show preferred exemplary embodiments in which individual features of the present disclosure are shown in combination with one another. Features of an exemplary embodiment can also be implemented separately from the other features of the same exemplary embodiment and can accordingly be combined by a person skilled in the art to form further useful combinations and sub-combinations with features of other exemplary embodiments.

BRIEF DESCRIPTION OF THE DRAWINGS

In the figures, functionally identical elements are denoted the same references.

There are shown, in schematic form.

DETAILED DESCRIPTION

Figure 1:
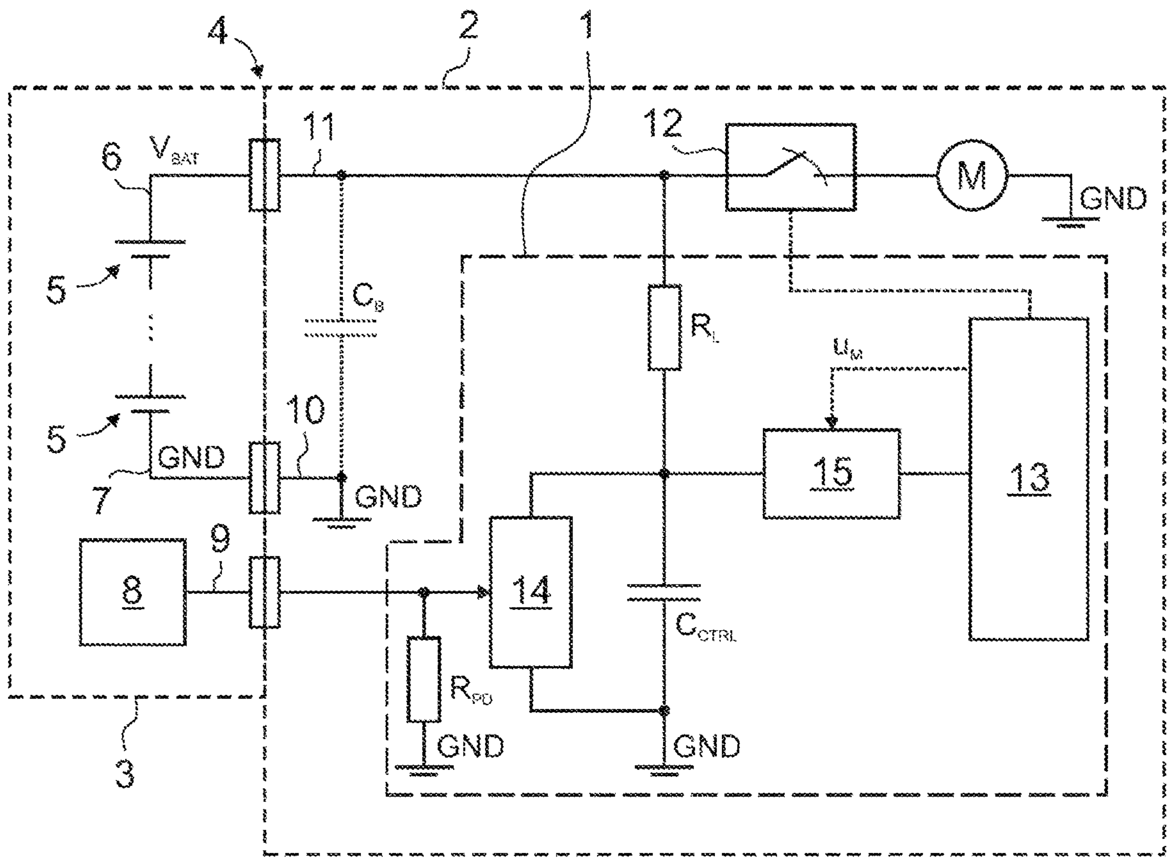
FIG. 1 illustrates a circuit diagram of a restart protection device for a battery-operated electric power tool having a battery pack connected to an electric power tool pack, according to an embodiment of the disclosure.

Shown schematically in FIG. 1 is an exemplary embodiment of a restart protection device 1 according to the disclosure for a battery-operated electric power tool 2.

The electric power tool 2 has at least one battery pack 3 and at least one battery-pack interface 4 for receiving the at least one battery pack 3. In the exemplary embodiment, the disclosure is shown on the basis of the use of exactly one battery pack 3 and exactly one battery-pack interface 4—however, this is not to be understood as restrictive.

The battery pack 3 may have one or more accumulator cells 5, which are usually connected to each other in series and together generate the supply voltage $V_{BAT}$ (battery voltage) of the battery pack 3. The battery pack 3 represented as an example has a connection line, realized as a supply line 6, and a ground line 7 carrying a ground potential GND, which are connected to the electric power tool 2 via the battery-pack interface 4 for the purpose of supplying the electric power tool 2.

Furthermore, the battery pack 3 has a battery management system 8, which in the exemplary embodiment is provided for monitoring the temperature of the battery pack 3. Provided for the purpose of transmitting the temperature signal to the electric power tool 2 there is a signal line, in this case a temperature control line 9, which is connected to the electric power tool 2 by means of the battery-pack interface 4.

The electric power tool 2 represented further comprises a buffer capacitor $C_B$, in particular an electrolytic capacitor, for compensating overvoltages between a ground connection 10 of the electric power tool 2 and a supply connection 11 of the electric power tool 2. However, the buffer capacitor $C_B$ is not absolutely necessary within the scope of the disclosure; the disclosure is, however, particularly advantageous for use with an electric power tool 2 that has such a buffer capacitor $C_B$. The buffer capacitor $C_B$ is shown as a dashed line in FIG. 1.

Furthermore, the electric power tool 2 has an operating switch 12 for selectively switching on or off a motor M of the electric power tool 2. The operating switch 12 can be locked in its switch-on position.

The restart protection device 1 comprises a control capacitor $C_{CTRL}$ having a cathode and an anode, the cathode being electrically connected to the ground connection 10 of the electric power tool 2 and the anode being electrically connected to a connection line of the battery pack 3 via the battery-pack interface 4 of the electric power tool 2. In the exemplary embodiment, the connection line is the supply line 6 of the battery pack 3. In principle, however, it may also be the signal line, for example the temperature control line 9 or another signal line of the battery pack 3.

The control capacitor $C_{CTRL}$ is charged if a battery pack 3 is inserted into the electric power tool 2 or if the supply voltage $V_{BAT}$ of the battery pack 3 is present. In the exemplary embodiment, the charging of the control capacitor $C_{CTRL}$ is delayed by the use of charging resistor $R_L$ connected ahead in series. The delay, or the charging resistor $R_L$, in this case may be dimensioned in such a manner that the control means 13, described below, and/or other electrical components of the electric power tool 2 have sufficient time for a boot process in order to reliably recognize a restart protection event. The use of a charging resistor $R_L$ is optional.

The restart protection device 1 also has a controllable discharge circuit 14 designed for discharging the control capacitor $C_{CTRL}$, a control input of the discharge circuit 14 being connected via the battery-pack interface 4 to a signal line of the battery pack 3, in this case to the temperature control line 9 of the battery pack 3. A removal of the battery pack 3 from the electric power tool 2 or a drop in the supply voltage of the battery pack 3 can thus be detected by monitoring of the temperature control line 9 of the battery pack 3 by the discharge circuit 14, whereupon the discharge circuit 14 discharges the control capacitor $C_{CTRL}$ in a controlled manner. For example, it may be provided that the discharge circuit 14 establishes a high-impedance connection between the cathode and the anode of the control capacitor $C_{CTRL}$ if the control input of the discharge circuit 14 is connected to the supply potential $V_{BAT}$, and otherwise establishes a low-impedance connection between the anode and the cathode of the control capacitor $C_{CTRL}$ Thus, in particular, if the temperature control line 9 of the battery pack 3 carries a potential different from the ground potential GND in the idle state (e.g. no-load state), the presence of the battery pack 3 can be recognized without data actually being transmitted via the temperature control line 9. If the battery pack 3 is removed, a pull-down resistor $R_{PD}$, for example, may connect the control input of the discharge circuit 14 to the ground connection 10 of the electric power tool 2. Alternatively, a pull-up resistor $R_{PU}$ may connect the control input of the discharge circuit 14 to the supply connection 11 of the electric power tool 2. The exemplary embodiment in FIG. 1 shows a variant having a pull-down resistor $R_{PD}$, and the exemplary embodiment in FIG. 2 shows a pull-up resistor $R_{PU}$.

Figure 2:
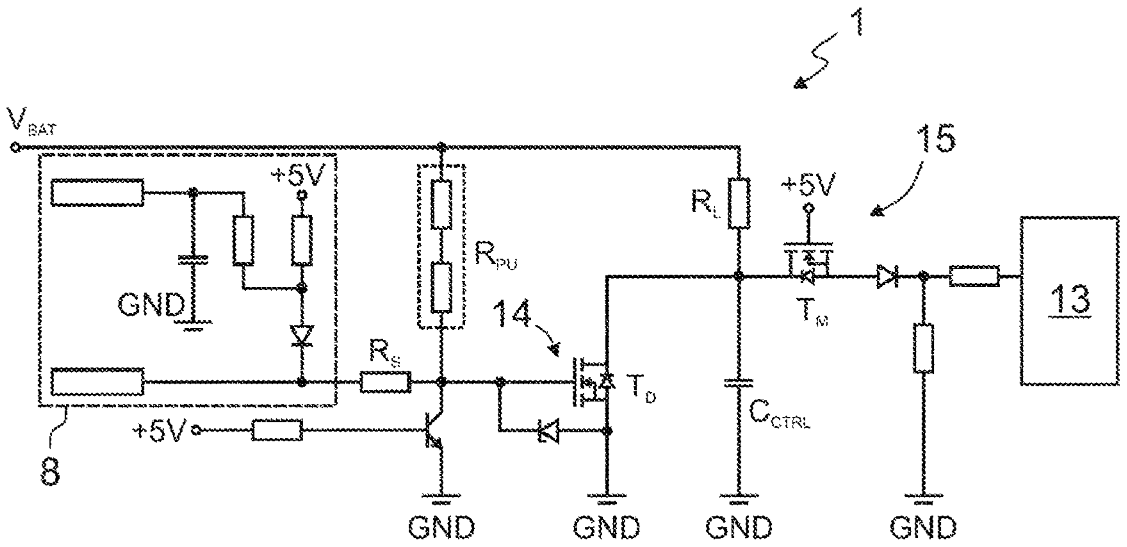
FIG. 2 illustrates a circuit diagram of a restart protection device, according to an alternate embodiment of the disclosure.

In principle, it should be noted that each electrical resistor mentioned in this description may also be composed of a plurality of individual resistors, as represented in the example of the pull-up resistor $R_{PU}$ in FIG. 2. This also applies analogously to other electrical components.

The restart protection device 1 is thus able to initiate discharging of the control capacitor $C_{CTRL}$ as soon as the supply voltage $V_{BAT}$ of the battery pack 3 drops, or the battery pack 3 is removed, although a possibly present buffer capacitor $C_B$ continues to keep the supply voltage $V_{BAT}$ constant.

The restart protection device 1 further comprises a measuring means 15 designed to detect the charge state of the control capacitor $C_{CTRL}$, and a control means 13 that is connected to the measuring means 15 and that is configured to block the starting of the electric power tool 2 if the charge state of the control capacitor $C_{CTRL}$ detected by means of the measuring means 15 is below a defined threshold value and at the same time the operating switch 12 of the electric power tool 2 is actuated, for example is locked.

Thus, the control means 13 detects the charge state of the control capacitor $C_{CTRL}$ by means of the measuring means 15, and blocks the starting of the motor M of the electric power tool 2 in the case of a restart protection event.

For rapid detection of a restart protection event it may be advantageous in this case if the threshold value is greater than 25% of the supply voltage $V_{BAT}$ of the battery pack 3, preferably greater than 50% of the supply voltage $V_{BAT}$ of the battery pack 3, particularly preferably greater than 75% of the supply voltage $V_{BAT}$ of the battery pack 3, for example even greater than 90% of the supply voltage $V_{BAT}$ of the battery pack 3.

Furthermore, it may be provided that the measuring means 15 has a controlled switch $T_M$ (cf. FIG. 2), in particular a semiconductor switch, via which the measuring means 15 can be connected to the anode of the control capacitor $C_{CTRL}$ for the purpose of detecting the charge state as required. For this purpose, the control means 13 may be configured, for example, to connect the measuring means 15 to the anode of the control capacitor $C_{CTRL}$ by means of a control signal $u_M$ (shown as a dashed line in FIG. 1) transmitted to the control input of the controlled switch $T_M$ of the measuring means 15, for the purpose of detecting the charge state of the control capacitor $C_{CTRL}$.

The control means 13 may be any control means of the electric power tool 2, which may also be such that it can be used for other tasks within the electric power tool 2.

FIG. 2 shows a further embodiment of the present disclosure, on the basis of a further circuit diagram in a partially more detailed view. In the following, it is substantially the differences compared with the exemplary embodiment represented in FIG. 1 that are discussed.

In the exemplary embodiment of FIG. 2, the discharge circuit 14 for discharging the control capacitor $C_{CTRL}$ has a controlled switch connected in parallel with the control capacitor $C_{CTRL}$, in the exemplary embodiment an n-channel MOSFET $T_D$. The gate terminal of the n-channel MOSFET $T_D$ is electrically connected to the temperature control line 9 of the battery pack 3, which carries the ground potential GND in the "idle state" and thus switches the n-channel MOSFET $T_D$ to high impedance on the output side when the battery pack 3 is inserted into the electric power tool 2. The control capacitor $C_{CTRL}$ is thus able to charge itself via the charging resistor $R_L$. If the battery pack 3 is removed, and thus also the ground connection to the temperature control line 9, a pull-up resistor $R_{PU}$ can connect the gate terminal of the n-channel MOSFET $T_D$ to the supply voltage $V_{BAT}$, which may be buffered by means of the buffer capacitor $C_B$.

Advantageously, the pull-up resistor $R_{PU}$ or the pull-down resistor $R_{PD}$ has a higher resistance than an electrical series resistor $R_S$ between the control input of the discharge circuit 14 and the signal line, or temperature control line 9, of the battery pack 3. In this way, parasitic discharge currents can be suppressed as far as possible when the battery pack 3 is inserted.

In the exemplary embodiment of FIG. 2, the measuring means 15 moreover likewise has an n-channel MOSFET $T_M$, via which the anode of the control capacitor $C_{CTRL}$ is connected to the control means 13. Thus, an input of the control means 13, for example an analogue-digital converter of an input of the control means 13, may be used to detect the charge state. As already mentioned, it may also be provided in this case that the control means 13 controls the connection of the measuring means 15 to the anode of the control capacitor $C_{CTRL}$ by means of a control signal $u_M$. However, this is not absolutely necessary; it may also be provided that the measuring means 15 is permanently connected to the anode of the control capacitor $C_{CTRL}$. For this purpose, the exemplary embodiment of FIG. 2 shows, by way of example, that the control input, or the gate terminal, of the n-channel MOSFET $T_M$ is permanently set to a potential of +5 volts.

The invention claimed is:

1. A restart protection device, comprising:

a control capacitor having a cathode and an anode, wherein the cathode is configured to be connected to a ground connection of a battery-operated electric power tool, and the anode is configured to be connected, via a battery-pack interface of the battery-operated electric power tool, to a connection line of a battery pack of the battery-operated electric power tool;

a controllable discharge circuit for discharging the control capacitor, wherein a control input of the discharge circuit is directly connected to a signal line of the battery pack via the battery-pack interface to detect presence or absence of the battery pack, wherein the control input is a gate terminal of a MOSFET and the signal line is a temperature control line or a data interface;

a measuring element for detecting a charge state of the control capacitor; and a controller connected to the measuring element, wherein the controller is configured to block a starting of the battery-operated electric power tool when an operating switch of the electric power tool is actuated, and at the same time, the charge state of the control capacitor detected by the measuring element is below a defined threshold value.

2. The restart protection device of claim 1, wherein the anode of the control capacitor is configured to be connected to the connection line of the battery pack via a charging resistor.

3. The restart protection device of claim 1, wherein the discharge circuit has a controlled switch configured to be connected in parallel with the control capacitor.

4. The restart protection device of claim 1, wherein the control input of the discharge circuit is configured to be connected via a pull-up resistor to a supply connection of the battery-operated electric power tool, or via a pull-down resistor to the ground connection of the battery-operated electric power tool.

5. The restart protection device of claim 4, wherein a resistance of the pull-up resistor or the pull-down resistor is higher than an electrical series resistance between the control input of the discharge circuit and the signal line of the battery pack.

6. The restart protection device of claim 1, wherein the threshold value is greater than 25% of a supply voltage of the battery pack.

7. The restart protection device of claim 1, wherein the measuring element for detecting the charge state has a controlled switch, wherein the controlled switch is configured to connect the measuring element to the anode of the control capacitor, and wherein the controlled switch comprises a semiconductor switch.

8. The restart protection device of claim 7, wherein the controller is configured to connect the measuring element to the anode of the control capacitor using a control signal transmitted to a control input of the controlled switch.

9. A battery-operated electric power tool, comprising:

a battery pack;

a battery pack interface configured to receive the battery pack; and a restart protection device, wherein the restart protection device comprises:

a control capacitor having a cathode and an anode, wherein the cathode is connected to a ground connection of the battery-operated electric power tool, and wherein the anode is connected, via the battery pack interface, to a connection line of the battery pack of the battery-operated electric power tool;

a controllable discharge circuit for discharging the control capacitor, wherein a control input of the controllable discharge circuit is directly connected to a signal line of the battery pack via the battery-pack interface to detect presence or absence of the battery pack, wherein the control input is a gate terminal of a MOSFET and the signal line is a temperature control line or a data interface;

a measuring element for detecting a charge state of the control capacitor; and a controller connected to the measuring element, wherein the controller is configured to block a starting of the electric power tool when an operating switch of the electric power tool is actuated, and at the same time, the charge state of the control capacitor detected by the measuring element is below a defined threshold value.

10. The battery-operated electric power tool of claim 9, wherein the anode of the control capacitor is connected to the connection line of the battery pack via a charging resistor, and wherein the connection line is a supply line of the battery pack or is the signal line of the battery pack.

11. The battery-operated electric power tool of claim 10, wherein the control input of the discharge circuit is connected via a pull-up resistor to a supply connection of the battery-operated electric power tool, or via a pull-down resistor to the ground connection of the battery-operated electric power tool, and wherein the restart protection device further comprises:

a buffer capacitor, wherein the buffer capacitor is configured to compensate for overvoltages between the ground connection of the battery-operated electric power tool and the supply connection of the battery-operated electric power tool, and wherein the buffer capacitor is an electrolytic capacitor.

12. The battery-operated electric power tool of claim 11, wherein a resistance of the pull-up resistor or the pull-down resistor is higher than an electrical series resistance between the control input of the controllable discharge circuit and the signal line of the battery pack.

13. The battery-operated electric power tool of claim 9, wherein the threshold value is greater than 25% of a supply voltage of the battery pack.

14. The battery-operated electric power tool of claim 9, wherein the measuring element for detecting the charge state comprises a controlled switch, and wherein the controlled switch is configured to connect the measuring element to the anode of the control capacitor, and wherein the controlled switch comprises a semiconductor switch.

15. The battery-operated electric power tool of claim 14, wherein the controller is configured to connect the measuring element to the anode of the control capacitor using a control signal transmitted to a control input of the controlled switch.

16. The battery-operated electric power tool of claim 9, wherein the controllable discharge circuit comprises a controlled switch configured to be connected in parallel with the control capacitor.

17. A restart protection method for a battery-operated electric power tool, the method comprising:

inserting a battery pack into the battery-operated electric power tool;

charging a control capacitor based at least in part on the inserting;

detecting a charge state of the control capacitor;

blocking a starting of the battery-operated electric power tool when an operating switch of the battery-operated electric power tool is actuated, wherein the blocking is based at least in part on detecting the charge state of the control capacitor is below a defined threshold value;

monitoring, using a controllable discharge circuit, a signal line of the battery pack, wherein a control input of the controllable discharge circuit is directly connected to the signal line via a battery-pack interface to detect presence or absence of the battery pack, wherein the control input is a gate terminal of a MOSFET and the signal line is a temperature control line or a data interface;

detecting a removal of the battery pack from the battery-operated electric power tool based at least in part on the monitoring; and discharging, using the controllable discharge circuit, the control capacitor, wherein the discharging is based on detecting the removal of the battery pack from the battery-operated electric power tool.

18. The restart protection method of claim 17, further comprising:

connecting a charging resistor in series with the control capacitor, wherein the charging resistor is configured to delay the charging of the control capacitor; and wherein one or more electrical components of the battery-operated electric power tool are given sufficient time for a boot process based in part on the delaying.

19. The restart protection method of claim 17, wherein the controllable discharge circuit comprises a controlled switch, the method further comprising:

connecting the controlled switch in parallel with the control capacitor.

20. The restart protection method of claim 17, wherein the threshold value is greater than 25% of a supply voltage of the battery pack.

* * * * *